United States Patent
Takagi

(10) Patent No.: US 8,447,660 B2
(45) Date of Patent: May 21, 2013

(54) ARTICLE SALES DATA PROCESSING APPARATUS AND SALES DATA EDITING METHOD

(75) Inventor: Hiroshi Takagi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/819,525

(22) Filed: Jun. 21, 2010

(65) Prior Publication Data

US 2011/0015986 A1      Jan. 20, 2011

(30) Foreign Application Priority Data

Jul. 17, 2009   (JP) ................. 2009-169176

(51) Int. Cl.
*G06Q 30/00*     (2012.01)
(52) U.S. Cl.
USPC .................................... 705/26.1
(58) Field of Classification Search ........... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| 7,083,092 B2 * | 8/2006 | Nakamura | 235/383 |
|---|---|---|---|
| 2005/0187808 A1 * | 8/2005 | Adamson et al. | 705/9 |
| 2008/0301009 A1 * | 12/2008 | Plaster et al. | 705/28 |

FOREIGN PATENT DOCUMENTS

| JP | 07-175974 | 7/1995 |
|---|---|---|
| JP | 10-255168 | 9/1998 |
| JP | 2005-275686 | 10/2005 |
| JP | 2005-284579 | 10/2005 |

OTHER PUBLICATIONS

William Dauphinais "Missing links: an insider's view of what you need (but rarely get) from accounting software.", PC Magazine, v6, n15, p. 168(2), Sep. 15, 1987. Retrieved from Dialog File 275, Acc#: 01208671.*

Japanese Office Action for Application No. 2009-169176 mailed on Apr. 19, 2011.

* cited by examiner

*Primary Examiner* — Naeem Haq
(74) *Attorney, Agent, or Firm* — Turocy & Watson, LLP

(57) ABSTRACT

According to one embodiment, an article sales data processing apparatus includes a list display control unit, a selection unit, an editing acceptance unit, and an update unit. The list display control unit causes a list of articles sold in one transaction to be displayed in the details area. The selection unit accepts selection of an article, of the articles displayed in the details area. The editing acceptance unit causes the display unit to display an editing screen for the sales data of the article selected by the selection unit, and accepts editing of the sales data. When the sales data displayed in the editing screen is edited, the update unit updates the sales data of the article selected by the selection unit, of the sales data of each article stored in the transaction storage unit, to the edited data.

9 Claims, 9 Drawing Sheets

|   | 2009/07/04 | | | | | Cashier | |
|---|---|---|---|---|---|---|---|
|   | Operation menu | ☐ ☐ ☐ Registration details ☐ ☐ ☐ | | | | Person in charge 1 | |
|   | NO | Attributes | Article name | Number of items | Unit price | Discount | Amount |
|   | 1 | | XXX | 1 | 100 | | 100 |
|   | 2 | | YYY | 1 | 200 | | 200 |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |
|   |   |   | ZZZ | | | | |
|   | One item | | 3 0 0 Yen | | Total | | Three items 600 Yen |

| Article code | Article name | Number of items | Unit price | Discount amount | Amount | Flag |
|---|---|---|---|---|---|---|
| xxx | XXX | 1 | 100 | | 100 | 1 |

32 —

| NO | Article code | Article name | Number of items | Unit price | Discount amount | Amount | Flag |
|---|---|---|---|---|---|---|---|
| 1 | xxx | XXX | 1 | 100 | | 100 | 1 |
| 2 | yyy | YYY | 1 | 200 | | 200 | 0 |

33 —

| Total number of items | Total amount |
|---|---|
| 3 | 400 |

34 —

| Article code | Article name | Number of items | Unit price | Discount amount | Amount | Flag |
|---|---|---|---|---|---|---|

35 —

| Registration-in-progress flag | Subtotal flag |
|---|---|
| f1 | f2 |

F I G. 4

US 8,447,660 B2

ARTICLE SALES DATA PROCESSING APPARATUS AND SALES DATA EDITING METHOD

CROSS-REFERENCE TO RELATED APPLICATIONS

This application is based upon and claims the benefit of priority from Japanese Patent Application No. 2009-169176, filed Jul. 17, 2009; the entire contents of which are incorporated herein by reference.

FIELD

Embodiments described herein relate generally to an article sales data processing apparatus such as a point-of-sales (POS) terminal which processes sales data of articles purchased by customers.

BACKGROUND

In a conventional POS terminal, when an article code of an article purchased by a customer is inputted, sales data of this article is registered in a memory. However, at this time, the registration of the sales data is not finalized yet. Therefore, editing of the sales data such as undo or discount is possible.

When a next article code is inputted or a subtotal key is operated to input a subtotal, the registration of the sales data is finalized. The sales data cannot be edited after the registration is finalized. Therefore, in the case of making a discount on an article for which the registration of its sales data is finalized, a cashier first carries out an operation to undo the registered sales data. Next, the cashier registers the sales data of this article again. Immediately after that, the cashier carries out an operation for discount.

In this manner, with the conventional article sales data processing apparatus, complicated operations are required in order to modify sales data with its registration finalized. Solutions are demanded.

BRIEF DESCRIPTION OF THE DRAWINGS

FIG. 3 shows an example of a registration screen displayed on a touch panel of the POS terminal.

FIG. 4 shows a principal memory area formed in a RAM of the POS terminal.

DETAILED DESCRIPTION

In general, according to one embodiment, an article sales data processing apparatus includes a transaction storage unit, a display unit, a list display control unit, a selection unit, a read-out unit, an editing acceptance unit, and an update unit. The transaction storage unit stores sales data of each article sold in one transaction. The display unit displays a registration screen including a details area. The list display control unit causes a list of articles sold in one transaction to be displayed in the details area on the basis of the sales data stored in the transaction storage unit. The selection unit accepts selection of an article, of the articles displayed in the details area. The read-out unit reads out the sales data of the article selected by the selection unit, from the transaction storage unit. The editing acceptance unit causes the display unit to display an editing screen for the sales data read out from the transaction storage unit by the read-out unit, and accepts editing of the sales data. When the sales data displayed in the editing screen is edited, the update unit updates the sales data of the article selected by the selection unit, of the sales data of each article stored in the transaction storage unit, to the edited data.

Hereinafter, as an embodiment of an article sales data processing apparatus, a case where the invention is applied to a POS terminal 1 installed in a retail store will be described with reference to the drawings.

Figure 1:
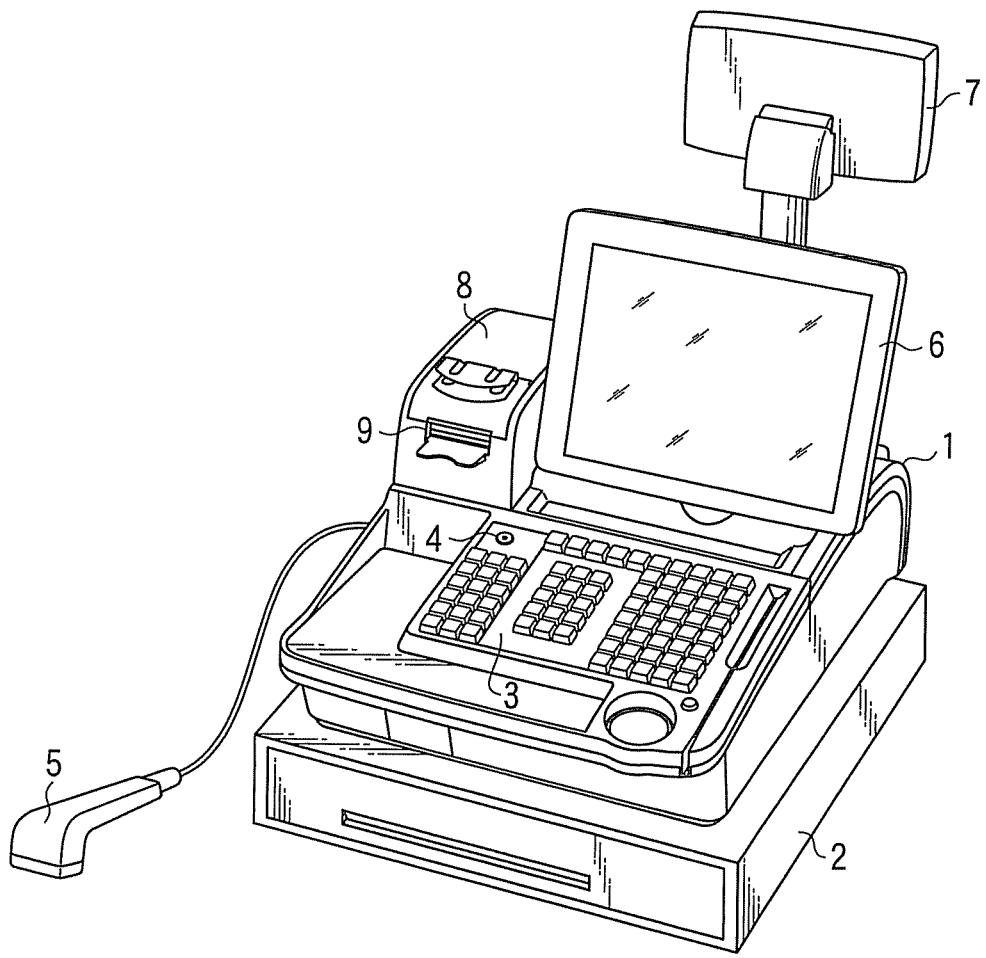
FIG. 1 is a perspective view showing the outer configuration of a POS terminal as an embodiment of an article sales data processing apparatus.

FIG. 1 is a perspective view showing the outer configuration of the POS terminal 1. The POS terminal 1 is placed on a drawer 2 for housing cash and the like and controls the opening and closing of the drawer 2.

The POS terminal 1 has a keyboard 3, a mode switch 4, a barcode scanner 5, a touch panel display 6 for cashier (hereinafter referred to as touch panel 6), a customer-side display device 7, a printer 8, and a receipt issue port 9.

On the keyboard 3, numeric keys to input numeric data, a subtotal key, a cash key, a credit key, an undo key, a discount key, a clear key and the like are arranged. The cash key is operated at the time of declaring the closing of registration of one transaction with cash payment. The credit key is operated at the time of declaring the closing of registration of one transaction with credit card payment. The cash key, the credit key and the like are called registration closing keys. The undo key is operated at the time of declaring the undo of article sales data that is registered immediately before. The discount key is operated at the time of declaring a discount on an article or a discount from a subtotal that is registered immediately before.

The mode switch 4 is for selecting from various operation modes including "registration", "inspection" and "settlement" and commands a CPU 11 to execute the selected mode. The mode switch 4 is switched, for example, by a key.

If the "registration" mode is selected, the POS terminal 1 mainly executes the following operations.

1. An operation to register sales data of an article in the memory on the basis of the article data inputted via the scanner 5 and an input unit of the keyboard 3.

2. An operation to calculate and display the total amount based on sales data of each article sold in one transaction.

3. An operation to calculate and display the difference between a deposit amount and the total amount, as the amount of change, when the deposit amount is inputted from the input unit.

4. An operation to print, on a receipt sheet, the content of sales data of each article sold in one transaction and thus issue a receipt.

The touch panel 6 and the customer-side display device 7 display the name of a registered article, the number of items sold, the amount of sales, the total amount for one transaction, the deposit amount, the amount of change and the like.

FIG. 3 shows an example of a registration screen 60 displayed on the touch panel 6. The registration screen 60 includes a current area 6a, a details area 6b, and a total area 6c. The current area 6a is an area for displaying the article name, the number of items sold and the amount of sales as the latest information of articles sold. The details area 6b is an area for displaying the article name, the number of items, the unit price, the discount amount, the amount of sales and the like, for each article sold in one transaction. The total area 6c is an area for displaying the total amount and the total number of items for each article sold in one transaction.

The printer 8 is to print the details of one transaction on a receipt sheet and a journal sheet. The receipt sheet printed by the printer 8 is issued from the receipt issue port 9.

Figure 2:
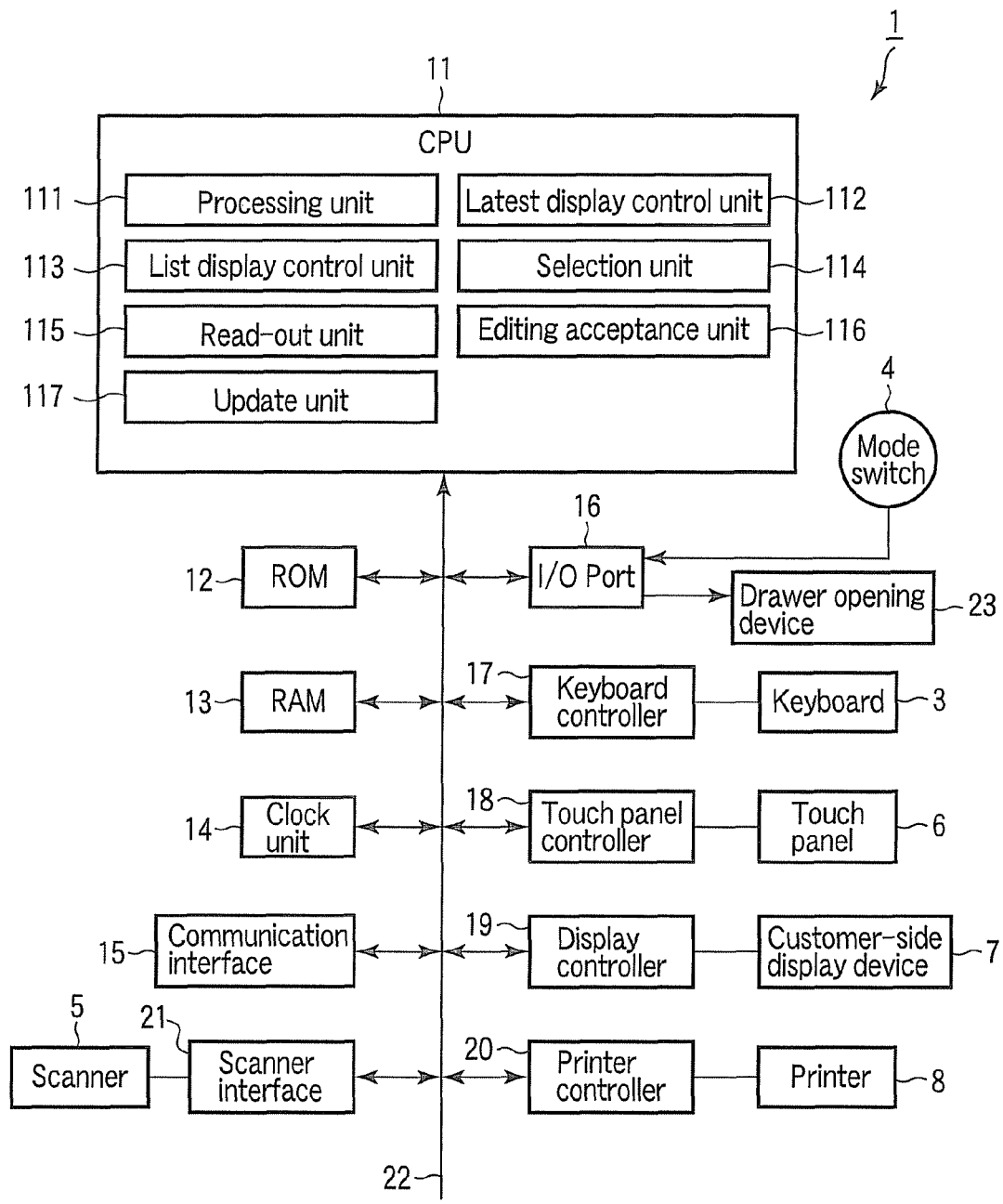
FIG. 2 is a block diagram showing the configuration of essential parts of the POS terminal.

FIG. 2 is a block diagram showing the principal configuration of the POS terminal 1. The POS terminal 1 has the CPU (central processing unit) 11 as a control body. A ROM (read only memory) 12, a RAM (random access memory) 13, a clock unit 14, a communication interface 15, an input-output port (I/O port) 16, a keyboard controller 17, a touch panel controller 18, a display controller 19, a printer controller 20 and a scanner interface 21 are connected to the CPU 11 via a bus line 22 such as address bus or data bus.

The clock unit 14 measures the current date and time. The communication interface 15 carries out data communication with a store computer connected via a network. The I/O port 16 inputs a signal from the mode switch 4. The I/O port 16 also outputs a driving signal to a drawer opening device 23 to open the drawer 2.

The keyboard controller 17 controls the keyboard 3 and takes in a key signal corresponding to an operated key. The touch panel controller 18 controls the touch panel 6 to display the registration screen 60 or the like. The touch panel controller 18 takes in a position signal on the screen operated by touch from the touch panel 6. The display controller 19 controls the customer-side display device 7 to display information for the customer. The printer controller 20 controls the printer 8 to issue a receipt. The scanner interface 21 takes in a barcode signal scanned by the scanner 5.

In the POS terminal 1, a current buffer 31, a transaction buffer 32, a total buffer 33, an editing buffer 34 and a flag memory 35 in the area configuration shown in FIG. 4 are formed in the RAM 13.

The current buffer 31 temporarily stores the latest sales data of articles sold in one transaction. The transaction buffer 32 stores sales data of each article sold in one transaction, in order of a series of record numbers. The sales data include article code, article name, the number of items sold, unit price, discount amount, the amount of sales, and discount target flag. The discount target flag is "1" when an article identified by the corresponding article code is an article on which a discount is allowed.

The current buffer 31 functions as a temporary storage unit. The transaction buffer 32 functions as a transaction storage unit.

The total buffer 33 stores the total number of items and the total amount in one transaction. The total number of items is a value acquired by adding the number of items of the article sold, temporarily stored in the current buffer 31, to the total of the number of items of each article stored in the transaction buffer 32. The total amount is a value acquired by adding the amount of sales of the article, temporarily stored in the current buffer 31, to the total of the amount of sales of each article stored in the transaction buffer 32.

The editing buffer 34 temporarily stores sales data of an article selected as an editing target, from the sales data of each article stored in the transaction buffer 32. The flag memory 35 stores a registration-in-progress flag f1 and a subtotal flag f2.

Figure 5:
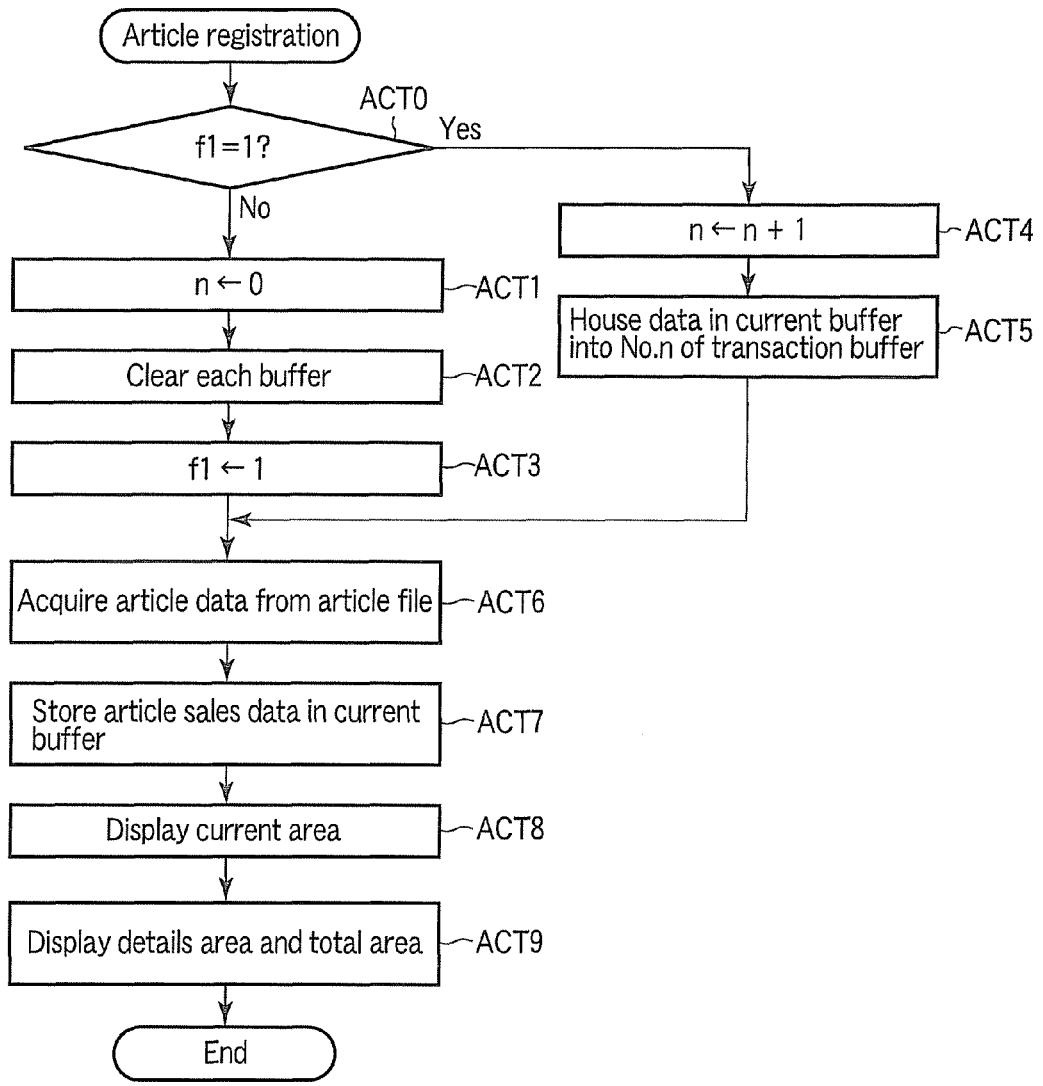
FIG. 5 is a flowchart showing procedures of article registration executed by a CPU of the POS terminal.

If an article code is inputted via the keyboard 3 or the scanner 5 in the state where the "registration" mode is selected by the mode switch 4, the CPU 11 executes article registration according to the procedures shown in the flowchart of FIG. 5. First, the CPU 11 checks the registration-in-progress flag f1 (ACT 0). Before the first article of one transaction is registered, the registration-in-progress flag f1 is set to "0". As an article is registered, the registration-in-progress flag f1 is set to "1".

If the registration-in-progress flag f1 is not set to "1" (NO in ACT 0), the CPU 11 executes the processing of ACT 1 to ACT 3. In ACT 1, the CPU 11 resets a counter n to zero. In ACT 2, the CPU 11 clears the buffers 31 to 34. In ACT 3, the CPU 11 sets the registration-in-progress flag f1 to "1".

If the registration-in-progress flag f1 is set to "1" (YES in ACT 0), the CPU 11 executes the processing of ACT 4 to ACT 5. In ACT 4, the CPU 11 increments the counter n by "1". In ACT 5, the CPU 11 houses the sales data stored in the current buffer 31 into an n-th record area in the transaction buffer 32. Here, "n" in the "n-th" coincides with the value of the counter n.

As the processing of ACT 3 or ACT 5 is finished, the CPU 11 executes the processing of ACT 6 to ACT 9. In ACT 6, the CPU 11 searches an article data file in which article data including article name, unit price, discount target flag and the like are set, corresponding to the article code for identifying each article. Then, the CPU 11 takes in article data that is set corresponding to an inputted article code. The article data file is stored in the store computer. The article data may be downloaded to the RAM 13 from the store computer.

In ACT 7, the CPU 11 multiplies the unit price of the article data by the number of items sold and thus calculates the amount of sales. The CPU 11 then creates sales data including article code, article name, the number of items sold, unit price, discount amount, the amount of sales and discount target flag, and writes the sales data in the current buffer 31. At this time, the discount amount is "0".

In ACT 8, the CPU 11 causes the article name, the number of items sold and the amount of sales, of the sales data stored in the current buffer 31, to be displayed in the current area 6a of the registration screen 60. In ACT 9, the CPU 11 causes the article name, the number of items sold, the unit price, the discount amount and the amount of sales, of each sales data stored in the transaction buffer 32, to be displayed in the details area 6b of the registration screen 60. The CPU 11 also causes the total number of items and the total amount stored in the total buffer 33 to be displayed in the total area 6c.

The CPU 11 repeats the processing according to the procedures shown in the flowchart of FIG. 5 every time an article code is inputted.

Here, in the CPU 11, a processing unit 111 is formed which, if the sales data of articles sold in one transaction are inputted, houses the sales data stored in the current buffer 31 into the transaction buffer 32 and registers the inputted sales data in the current buffer 31 through the processing of ACT 5 to ACT 7.

In the CPU 11, there is also a latest display control unit 112 which causes the sales data stored in the current buffer 31 to be displayed in the current area 6a, which is different from the details area 6b of the registration screen 60, through the processing of ACT 8.

In the CPU 11, there is also a list display control unit 113 which displays a list of articles sold in one transaction in the details area 6b on the basis of the sales data stored in the transaction buffer 32 through the processing of ACT 9.

If the undo key is inputted after the processing of ACT 9, the CPU 11 clears the data in the current buffer 31. Therefore, a value acquired by subtracting the data in the current buffer 31 from the total value is restored as the data stored in the total buffer 33.

Similarly, if the discount key is inputted after the processing of ACT 9, the CPU 11 checks the discount target flag in the current buffer 31. If an article on which a discount is not allowed is registered immediately before, the discount target flag is "0". At this time, the CPU 11 determines that the input of the discount key is an error.

Meanwhile, if an article on which a discount is allowed is registered immediately before, the discount target flag is "1". At this time, the CPU 11 accepts the input of the discount amount. As the discount amount is inputted via numeric keys, the CPU 11 stores that discount amount in the current buffer 31. The CPU 11 also updates the amount of sales in the current buffer 31 to a value acquired as a result of subtracting the discount amount. At this time, the total amount data in the total buffer 33 is also updated to the amount after the discount.

Figure 6:
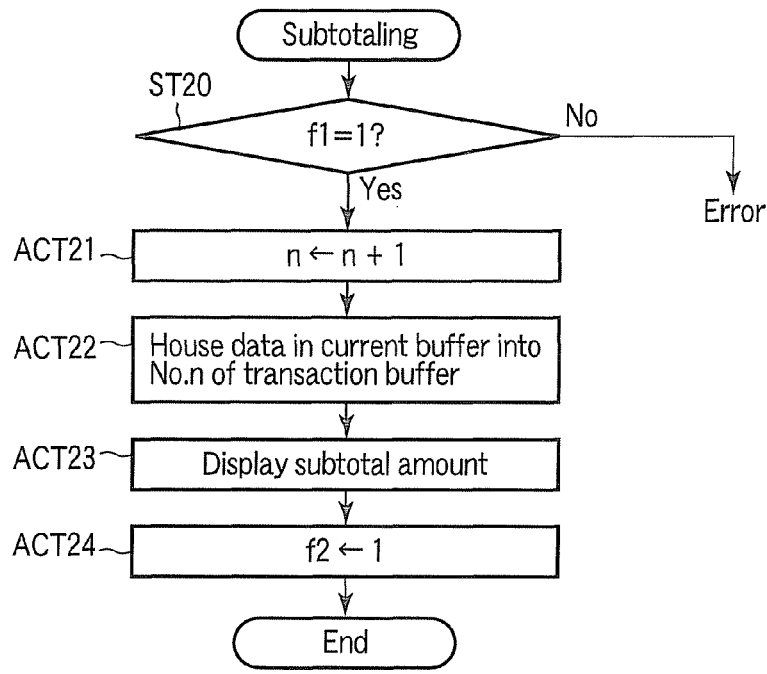
FIG. 6 is a flowchart showing procedures of subtotaling executed by the CPU of the POS terminal.

If the subtotal key is inputted in the state where the "registration" mode is selected, the CPU 11 executes subtotaling according to the procedures shown in the flowchart of FIG. 6. First, the CPU 11 checks the registration-in-progress flag f1 (ACT 20). If the registration-in-progress f1 is not set to "1" (NO in ACT 20), it is determined that the input of the subtotal key is an error.

If the registration-in-progress f1 is set to "1" (YES in ACT 20), the CPU 11 executes the processing of ACT 21 to ACT 24. In ACT 21, the CPU 11 increments the counter n by "1". In ACT 22, the CPU 11 houses the sales data stored in the current buffer 31 into an n-th record area of the transaction buffer 32. In ACT 23, the CPU 11 causes the customer-side display device 7 to display the total mount stored in the total buffer 33. In ACT 24, the subtotal flag f2 is set to "1".

Figure 7:
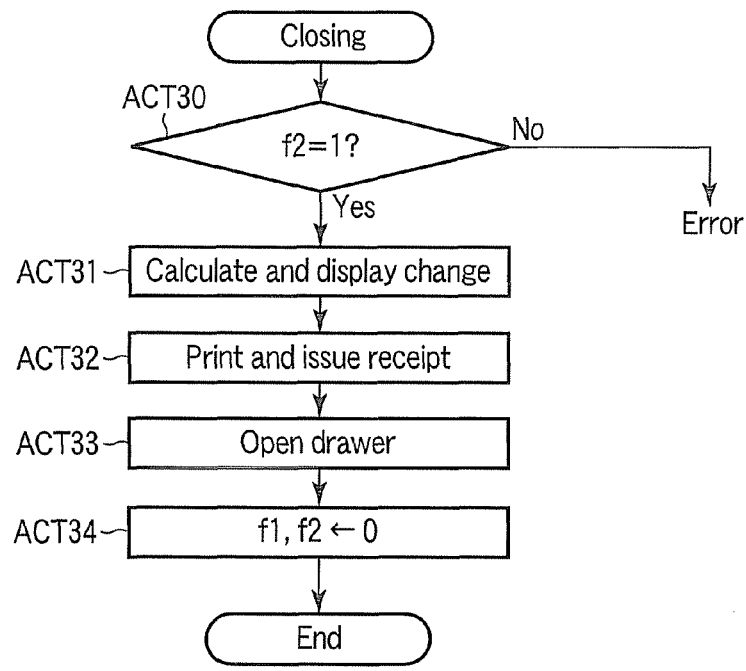
FIG. 7 is a flowchart showing procedures of closing executed by the CPU of the POS terminal.

If the cash key is inputted in the state where the "registration" mode is selected, the CPU 11 executes closing according to the procedures shown in the flowchart of FIG. 7. First, the CPU 11 checks the subtotal flag f2 (ACT 30). If the subtotal flag f2 is not set to "1" (NO in ACT 30), it is determined that the input of the cash key is an error.

If the subtotal flag f2 is set to "1" (YES in ACT 30), the CPU 11 executes the processing of ACT 31 to ACT 34. In ACT 31, the CPU 11 calculates change and causes each of the touch panel 6 and the customer-side display device 7 to display the amount of change. In ACT 32, the CPU 11 creates receipt print data based on the content of the transaction buffer 32 and outputs the receipt print data to the printer 8 to issue a receipt. In ACT 33, the CPU 11 outputs a driving signal to the drawer opening device 23 from the I/O port 16 and thus causes the drawer 2 to open. In ACT 34, the CPU 11 resets the registration-in-progress flag f1 and the subtotal flag f2 to "0".

Figure 8:
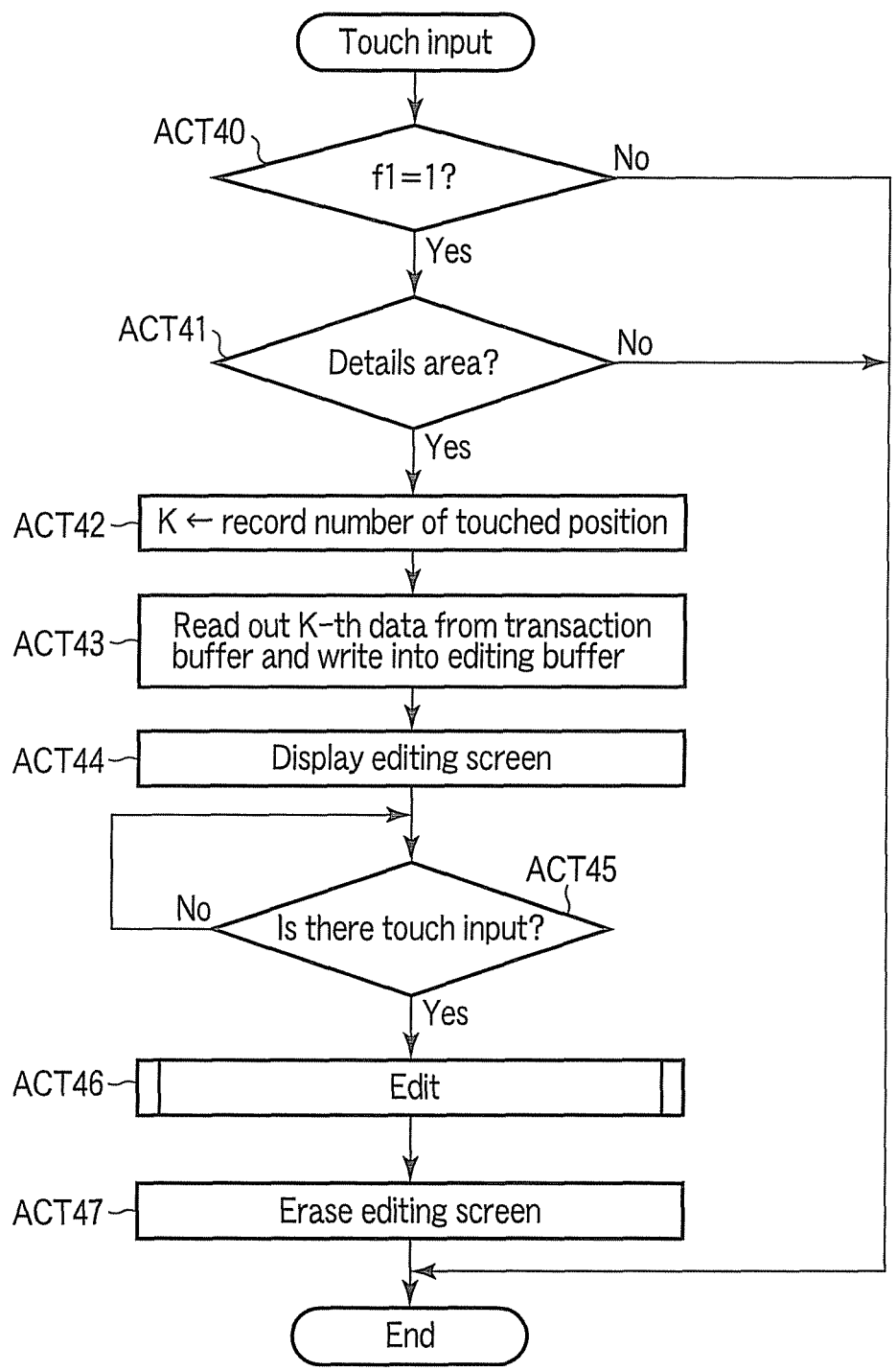
FIG. 8 is a flowchart showing procedures of touch input executed by the CPU of the POS terminal.

If the touch panel 6 is operated by touch in the state where the "registration" mode is selected, the CPU 11 executes touch input according to the procedures shown in the flowchart of FIG. 8. First, the CPU 11 checks the registration-in-progress f1 (ACT 40). If the registration-in-progress f1 is not set to "1" (NO in ACT 40), the CPU 11 ignores the input from the touch panel 6.

If the registration-in-progress f1 is set to "1" (YES in ACT 40), the CPU 11 determines whether the touched site is within the details area 6b of the registration screen 60 or not (ACT 41). If any of the areas outside the details area 6b is touched (NO in ACT 41), the CPU 11 ignores the input from the touch panel 6.

If the details area 6b is touched (YES in ACT 41), the CPU 11 executes the processing of ACT 42 to ACT 44. In ACT 42, the CPU 11 recognizes a record number k of sales data displayed at the touched site, on the basis of coordinate data of the touched position on the screen and layout data of the registration screen 60.

In ACT 43, the CPU 11 reads out the sales data corresponding to the record number k from the transaction buffer 32 and writes the read-out sales data into the editing buffer 34. In ACT 44, the CPU 11 creates an editing screen 70 based on the sales data housed in the editing buffer 34 and causes the touch panel 6 to display this editing screen 70.

Figure 9:
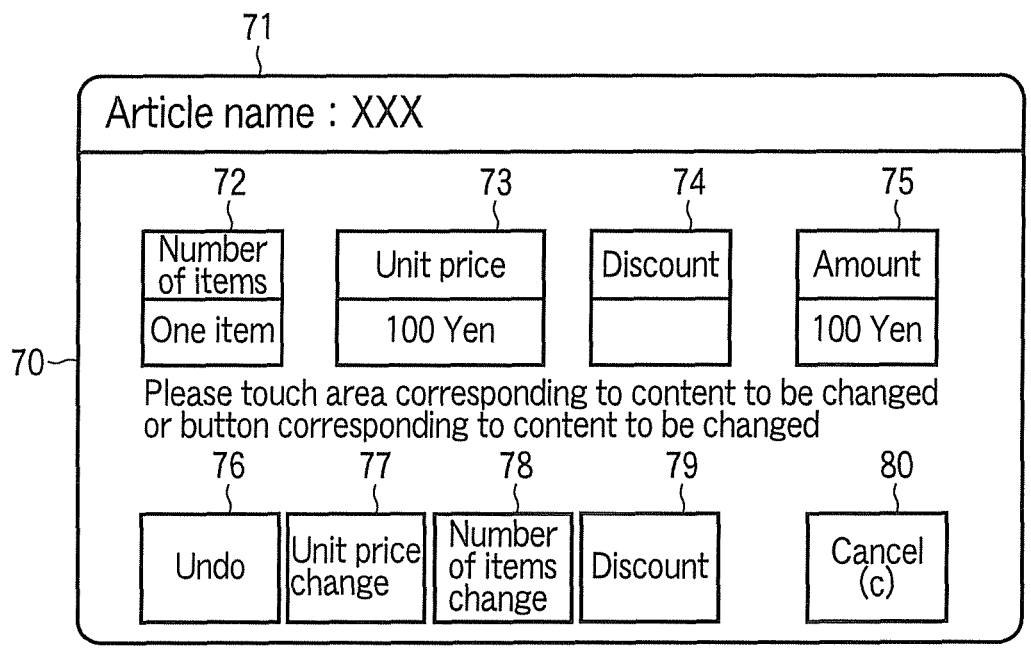
FIG. 9 shows an example of an editing screen displayed on the touch panel of the POS terminal.

FIG. 9 shows an example of the editing screen 70. The editing screen 70 includes an article name area 71, a number of items area 72, a unit price area 73, a discount area 74 and an amount area 75, and an undo button 76, a unit price change button 77, a number of items change button 78, a discount button 79 and a cancel button 80. The data stored in the editing buffer 34 is displayed in the areas 71 to 75.

Here, in the CPU 11, there is a selection unit 114 which accepts the selection of an article from the articles displayed in the details area 6b through the processing of ACT 40 to ACT 42. There is also a read-out unit 115 which reads out the sales data of the article selected by the selection unit 114 from the transaction buffer 32 through the processing of ACT 43. There is also an editing acceptance unit 116 which causes the touch panel 6 to display the editing screen 70 for the sales data read out from the transaction buffer 32 by the read-out unit 115 and accepts the editing of the sales data through the processing of ACT 44.

As the editing screen 70 is displayed, the CPU 11 waits for the touch panel 6 to be operated by touch again (ACT 45). When the touch panel 6 is operated by touch, the CPU 11 executes the editing of sales data corresponding to the touched position (ACT 46).

Figure 10:
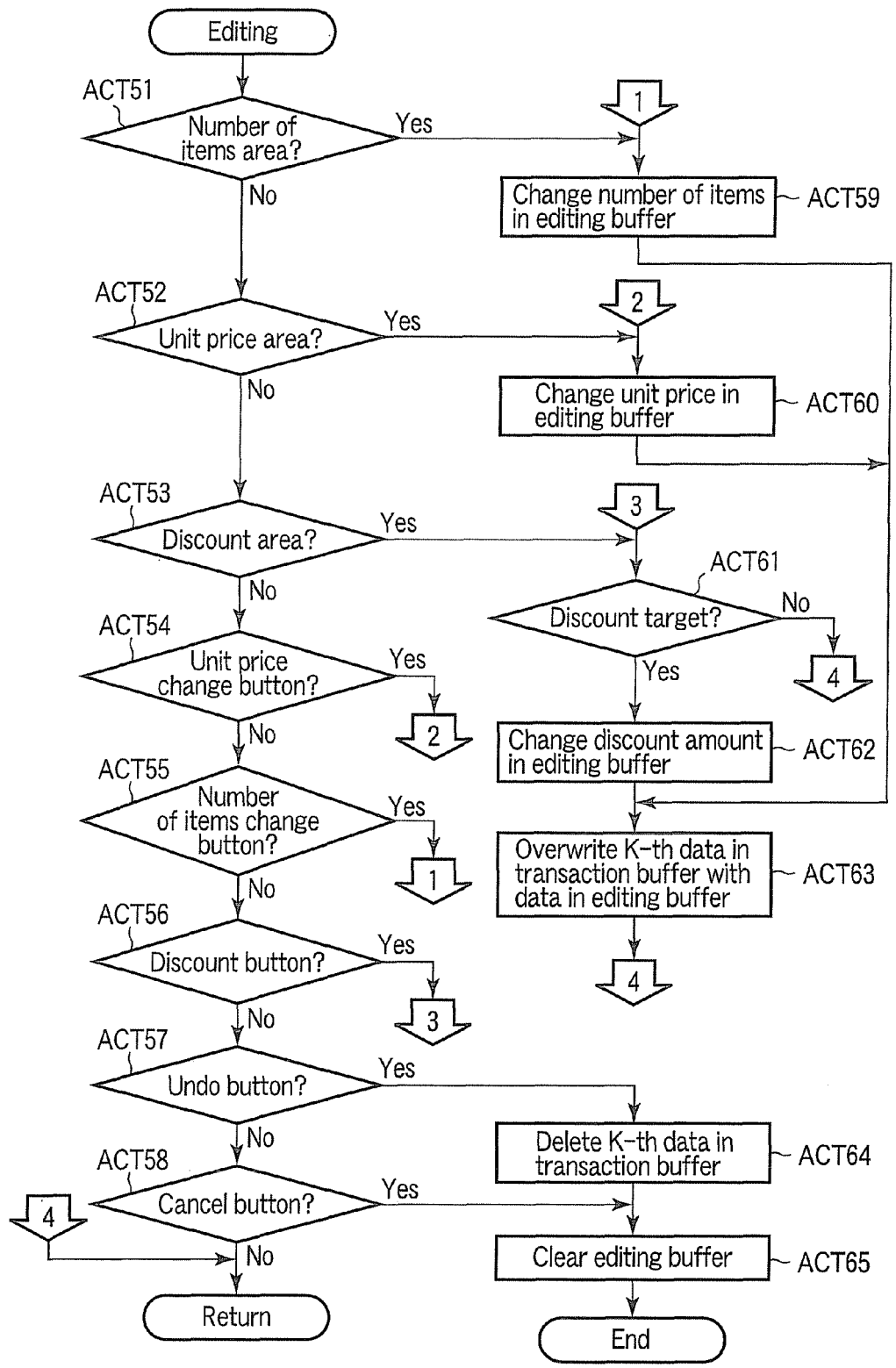
FIG. 10 is a flowchart showing details of data editing executed in a processing block of ACT 46 shown in FIG. 8.

FIG. 10 is a flowchart showing details of the procedures of the editing. First, the CPU 11 determines whether the touched site is any of the display areas 72 to 74 corresponding to entries that can be edited, that is, the number of items, the unit price, and the discount amount (ACT 51 to ACT 53). If the touched site is none of these display areas (NO in all of ACT 51 to ACT 53), the CPU 11 determines whether the touched site is any of the display areas of the buttons 76 to 80 (ACT 54 to ACT 58). If the touched site is none of the display areas of the buttons 76 to 80 (NO in all ACT 54 to ACT 58), the CPU 11 waits for a next touch operation.

If the number of items area is touched (YES in ACT 51), or if the number of items change button 78 is touched (YES in ACT 55), the CPU 11 changes the number of items sold, of the sales data stored in the editing buffer 34, to a numeric value inputted via numeric keys. Moreover, the amount of this sales data is changed to a value that is acquired by multiplying the unit price by the changed number of items sold and then subtracting the discount amount from the resulting value (ACT 59). After that, the k-th record in the transaction buffer 32 is overwritten with the sales data stored in the editing buffer 34 (ACT 63).

If the unit price area 73 is touched (YES in ACT 52), or if the unit price change button 77 is touched (YES in ACT 54), the CPU 11 changes the unit price included in the sales data stored in the editing buffer 34 to a numeric value inputted via numeric keys. Moreover, the amount of this sales data is changed to a value that is acquired by multiplying the changed unit price by the number of items sold and then subtracting the discount amount from the resulting value (ACT 60). After that, the k-th record in the transaction buffer 32 is overwritten with the sales data stored in the editing buffer 34 (ACT 63).

If the discount area 74 is touched (YES in ACT 53), or if the discount button 79 is touched (YES in ACT 56), the CPU 11 checks the discount target flag included in the sales data stored in the editing buffer 34 (ACT 61). If the discount target flag is reset to "0" (NO in ACT 61), the CPU 11 ignores the touch input.

If the discount target flag is set to "1" (YES in ACT 61), the CPU 11 changes the discount amount included in the sales data stored in the editing buffer 34 to a numeric value inputted via numeric keys. Moreover, the amount of this sales data is changed to a value that is acquired by subtracting the changed discount amount (ACT 62). After that, the k-th record in the transaction buffer 32 is overwritten with the sales data stored in the editing buffer 34 (ACT 63).

If the undo button 76 is touched (YES in ACT 57), the CPU 11 deletes the sales data that is the k-th record in the transaction buffer 32. Moreover, the number and amount corresponding to the deleted sales data are subtracted from the total number of items and the total amount displayed in the total area 6c of the registration screen 60 (ACT 64). After that, the sales data stored in the editing buffer 34 is cleared (ACT 65).

If the cancel button 80 is touched (YES in ACT 58), the CPU 11 clears the sales data stored in the editing buffer 34 (ACT 65).

As the editing buffer 34 is cleared, the editing is finished. When the editing is finished, the CPU 11 erases the editing screen 70 (ACT 47).

Here, in the CPU 11, there is an update unit 117 which, when the sales data displayed on the editing screen 70 is edited, updates the sales data of the article selected by the selection unit 114, of the sales data of articles stored in the transaction buffer 32, to the edited data through the processing of ACT 63.

The functions of the processing unit 111, the latest display control unit 112, the list display control unit 113, the selection unit 114, the read-out unit 115, the editing acceptance unit 116 and the update unit 117 provided in the CPU 11 are realized by a program stored in the ROM 12.

In this manner, the POS terminal 1 according to this embodiment can execute editing including undo, unit price change, and discount not only for the sales data of an article that is registered immediately before, displayed in the current area 6a of the registration screen 60, but also for the sales data of an article with its registration finalized, displayed in the details area 6b.

Moreover, simply by touch-operating an area within the details area 6b where the sales data of an editing target is displayed, it is possible to select the sale data of this editing target. Also, since the editing screen 70 is displayed and the sales data can be edited on this screen, the operation required is very simple.

The invention is not limited to the above embodiment in its described form. In practice, components of the embodiment can be modified without departing from the scope of the invention.

For example, in the embodiment, the editing screen 70 may be displayed by overlapping on the registration screen 60. Alternatively, it is also possible to temporarily erase the registration screen 60 and display the editing screen 70, and then display the registration screen 60 again on completion of the editing.

In the embodiment, the discount is described as an example of the data editing. However, if a mechanism to input a discount rate instead of a discount amount is employed, it is possible to similarly cope with the case where a discount on price is made at a predetermined rate.

In the embodiment, the case where the program is recorded in advance in the ROM 12 is described. However, without being limited to this embodiment, the program may be downloaded to the POS terminal 1 from a network or the program stored in a recording medium may be installed in the POS terminal 1. The recording medium may be in any form of recording medium that can store a program and can be read by the apparatus, such as CD-ROM. The functions acquired in advance by installation or downloading may also be realized in cooperation with the OS (operating system) or the like in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article sales data processing apparatus comprising:
    a transaction storage unit which stores sales data of each article sold in one transaction;
    an editing buffer which stores the sales data in an editable state;
    a display unit which displays a registration screen including a details area;
    a list display control unit which causes a list of articles sold in one transaction to be displayed in the details area on the basis of the sales data stored in the transaction storage unit;
    a selection unit which accepts selection of an article, of the articles displayed in the details area;
    a read-out unit which reads out the sales data of the article selected by the selection unit from the transaction storage unit, and stores the sales data in the editing buffer;
    an editing acceptance unit which causes the display unit to display an editing screen for the sales data stored in the editing buffer, and accepts editing of the sales data;
    an update unit, which when the sales data displayed in the editing screen is edited, updates the sales data of the article selected by the selection unit, of the sales data of each article stored in the transaction storage unit, to the edited data by rewriting the data of the transaction storage unit with the sales data stored in the editing buffer; wherein
    the sales data stored in the transaction storage unit includes flag data to identify whether an article is an article on which a discount is allowed or not, and
    when the article selected by the selection unit is an article on which a discount is allowed, the editing acceptance unit accepts a change in the amount; and wherein
    the editing screen includes a discount amount display section which displays a discount amount included in the sales data, and
    when the discount amount displayed in the discount amount display section is changed, the editing acceptance unit performs processing, assuming that the amount included in the sales data is changed to an amount acquires as a result of making a discount by the changed discount amount.

2. The apparatus of claim 1, wherein in the display unit, an area where at least the details area is displayed, on the registration screen, is a touch panel.

3. The apparatus of claim 1, wherein the editing acceptance unit accepts a change in the number of items included in the sales data.

4. The apparatus of claim 3, wherein the editing screen includes a number of items display section which displays a number of items included in the sales data, and when the number of items displayed in the number of items display section is changed, the editing acceptance unit performs processing, assuming that the number of items included in the sales data is changed to a changed number of items.

5. The apparatus of claim 1, wherein the editing acceptance unit accepts a change in an amount included in the sales data.

6. The apparatus of claim 5, wherein the editing screen includes a unit price display section which displays a unit price included in the sales data, and when the unit price displayed in the unit price display section is changed, the editing acceptance unit performs processing, assuming that the amount included in the sales data is changed to an amount based on the changed unit price.

7. The apparatus of claim 1, further comprising:

a temporary storage unit which temporarily stores sales data of an article;

a processing unit which, when sales data of articles sold in one transaction is inputted, houses the sales data stored in the temporary storage unit into the transaction storage unit and registers the inputted sales data in the temporary storage unit; and a latest display control unit which causes the sales data stored in the temporary storage unit to be displayed in an area that is different from the details area on the registration screen.

8. The apparatus of claim 1, wherein when closing of registration of the one transaction is declared, closing processing is executed based on the sales data of each article stored in the transaction storage unit.

9. A sales data editing method for an article sales data processing apparatus, the method comprising:

storing sales data of each article sold in one transaction, in a transaction storage unit;

storing the sales data in an editable state in an editing buffer;

displaying a list of articles sold in one transaction in a details area on a registration screen displayed on a display unit on the basis of the data stored in the transaction storage unit;

accepting selection of an article from the articles displayed in the details area;

reading out the sales data of the selected article from the transaction storage unit and storing the sales data in the editing buffer;

displaying an editing screen for the sales data stored in the editing buffer, on the display unit, and accepting editing of the sales data; and when the sales data displayed on the editing screen is edited, updating the sales data of the selected article, of the sales data of the articles stored in the transaction storage unit, to the edited data by rewriting the data of the transaction storage unit with the sales data stored in the editing buffer, wherein the sales data stored in the transaction storage unit includes flag data to identify whether an article is an article on which a discount is allowed or not, and when the article selected by the selection unit is an article on which a discount is allowed, the editing acceptance unit accepts a change in the amount; and wherein the editing screen includes a discount amount display section which displays a discount amount included in the sales data, and when the discount amount displayed in the discount amount display section is changed, the editing acceptance unit performs processing, assuming that the amount included in the sales data is changed to an amount acquires as a result of making a discount by the changed discount amount.

* * * * *